United States Patent
Moussakhani et al.

(10) Patent No.: US 12,525,705 B2
(45) Date of Patent: Jan. 13, 2026

(54) PARASITIC ELEMENT TO REDUCE COUPLING BETWEEN ANTENNAE ON AN EYEGLASS FRAME

(71) Applicant: Google LLC, Mountain View, CA (US)

(72) Inventors: Kaveh Moussakhani, Mountain View, CA (US); Chia-Hang Yeh, Campbell, CA (US); Emeka Godswill Ugwu, Milpitas, CA (US); Jiang Zhu, Mountain View, CA (US); Wenjing Su, Mountain View, CA (US)

(73) Assignee: Google LLC, Mountain View, CA (US)

( * ) Notice: Subject to any disclaimer, the term of this patent is extended or adjusted under 35 U.S.C. 154(b) by 575 days.

(21) Appl. No.: 17/648,761

(22) Filed: Jan. 24, 2022

(65) Prior Publication Data

US 2023/0238688 A1    Jul. 27, 2023

(51) Int. Cl.
| | |
|---|---|
| *H01Q 1/27* | (2006.01) |
| *H01Q 1/22* | (2006.01) |
| *H01Q 1/52* | (2006.01) |
| *H01Q 9/30* | (2006.01) |

(52) U.S. Cl.
CPC ............ *H01Q 1/273* (2013.01); *H01Q 1/2291* (2013.01); *H01Q 1/528* (2013.01); *H01Q 9/30* (2013.01)

(58) Field of Classification Search
CPC ...... H01Q 1/2291; H01Q 1/528; H01Q 1/521; H01Q 1/273; H01Q 9/30
See application file for complete search history.

(56) References Cited

U.S. PATENT DOCUMENTS

| | | |
|---|---|---|
| 9,024,830 B2 | 5/2015 | Okajima et al. |
| 2008/0055537 A1 | 3/2008 | Asrani et al. |
| 2009/0322634 A1 | 12/2009 | Yun et al. |

(Continued)

FOREIGN PATENT DOCUMENTS

| | | |
|---|---|---|
| CN | 108535887 A | 9/2018 |
| CN | 110581347 A | 12/2019 |

(Continued)

OTHER PUBLICATIONS

International Search Report and Written Opinion for PCT Application No. PCT/US2023/060482, mailed on Mar. 30, 2023, 21 pages.

(Continued)

*Primary Examiner* — Awat M Salih
(74) *Attorney, Agent, or Firm* — Brake Hughes Bellermann LLP

(57) ABSTRACT

An apparatus includes an eyeglass frame, a first antenna, a second antenna, and a parasitic element. The eyeglass frame can include at least one rim. The first antenna can be attached to the eyeglass frame. The second antenna can be attached to the eyeglass frame. The second antenna can be disposed on a first side of the at least one rim. The parasitic element can be attached to the eyeglass frame. The parasitic element can be on a second side of the at least one rim. The second side of the at least one rim can be opposite from the first side. A distance from the first antenna to the second antenna can be greater than a distance from the first antenna to the parasitic element. The distance from the first antenna to the second antenna can be greater than a distance from the second antenna to the parasitic element.

21 Claims, 19 Drawing Sheets

(56) References Cited

U.S. PATENT DOCUMENTS

| | | |
|---|---|---|
| 2018/0270900 A1 | 9/2018 | Zhu et al. |
| 2019/0198982 A1* | 6/2019 | Moore .................. H01Q 1/273 |
| 2019/0237856 A1 | 8/2019 | Rautio |
| 2023/0076226 A1* | 3/2023 | Yang ...................... H01Q 21/28 |
| 2024/0012245 A1* | 1/2024 | Adema .............. G02B 27/0176 |

FOREIGN PATENT DOCUMENTS

| | | |
|---|---|---|
| WO | 2014168499 A1 | 10/2014 |
| WO | 2018145044 A1 | 8/2018 |

OTHER PUBLICATIONS

Wang, et al., "SUB-6GHZ 4G/5G Conformal Glasses Antennas", IEEE Access; vol. 7, 2019, 10 pages.

\* cited by examiner

PARASITIC ELEMENT TO REDUCE COUPLING BETWEEN ANTENNAE ON AN EYEGLASS FRAME

TECHNICAL FIELD

This description relates to wireless communication.

BACKGROUND

Electronic devices can include multiple antennae to communicate via multiple communication protocols that share a same center frequency, such as Institute for Electrical and Electronics Engineers (IEEE) 802.11 (Wireless Fidelity/WiFi) and Bluetooth™. The transmissions via same or similar frequencies can interfere with each other, reducing throughput.

SUMMARY

According to a first embodiment, an apparatus can include an eyeglass frame, a first antenna, a second antenna, and a parasitic element. The eyeglass frame can include at least one rim. The first antenna can be attached to the eyeglass frame. The second antenna can be attached to the eyeglass frame. The second antenna can be disposed on a first side of the at least one rim. The parasitic element can be attached to the eyeglass frame. The parasitic element can be on a second side of the at least one rim. The second side of the at least one rim can be opposite from the first side. A distance from the first antenna to the second antenna can be greater than a distance from the first antenna to the parasitic element. The distance from the first antenna to the second antenna can be greater than a distance from the second antenna to the parasitic element.

An apparatus can include an eyeglass frame, a first antenna attached to the frame, a second antenna attached to the frame, and a conductive sheet attached to the frame. A distance from the conductive sheet to the first antenna can be less than a distance from the first antenna to the second antenna. A distance from the conductive sheet to the second antenna can be less than the distance from the first antenna to the second antenna. A first angle of incidence between a first ray extending from a center of the first antenna to a center of the conductive sheet and a first line perpendicular to a first surface of the conductive sheet at a first point of incidence from the first ray can be less than forty-five degrees (45°). A second angle of incidence between a second ray extending from a center of the second antenna to the center of the conductive sheet and a second line perpendicular to a second surface of the conductive sheet, the second surface being opposite from the first surface, at a second point of incidence from the second ray can be less than forty-five degrees (45°).

An apparatus can include a frame, a first antenna, a second antenna, and a parasitic element. The frame can include a first rim, a second rim, a bridge disposed between and attached to the first rim and the second rim, a first temple arm rotatably attached to the first rim, and a second temple arm rotatably attached to the second rim. T first antenna can be attached to a portion of the first rim. The second antenna can be attached to a portion of the second rim that is closer to the first temple arm than to the bridge. The parasitic element can be attached to a portion of the second rim that is closer to the bridge than to the second temple arm.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

An apparatus can include an eyeglass frame and a parasitic element, which can also be referred to as a conductive sheet. The parasitic element can reduce interference and/or coupling between two antennae that are attached to the apparatus. The reduction of interference and/or coupling can increase the throughput or goodput, of data sent and received by each of the antennae. In some examples, the apparatus can include a virtual reality and/or augmented reality headset.

The parasitic element can be located between, or close to between the two antennae that are included in the apparatus. The parasitic element (which can include more than one component or portions) can be disposed perpendicular to an axis extending between the antennae to maximize a surface area of each of two sides of the parasitic element facing the respective antenna. The maximization of the surface area can maximize the reduction of interference and/or coupling. While this description describes two antennae and one parasitic element included in the apparatus, any number of antennae and parasitic elements may be included in the apparatus. For example, more than one parasitic element may be disposed between two antennae. As another example, a parasitic element can be disposed between one antenna on a first side of the parasitic element and two antennae on a second side of the parasitic element.

Figure 1A:
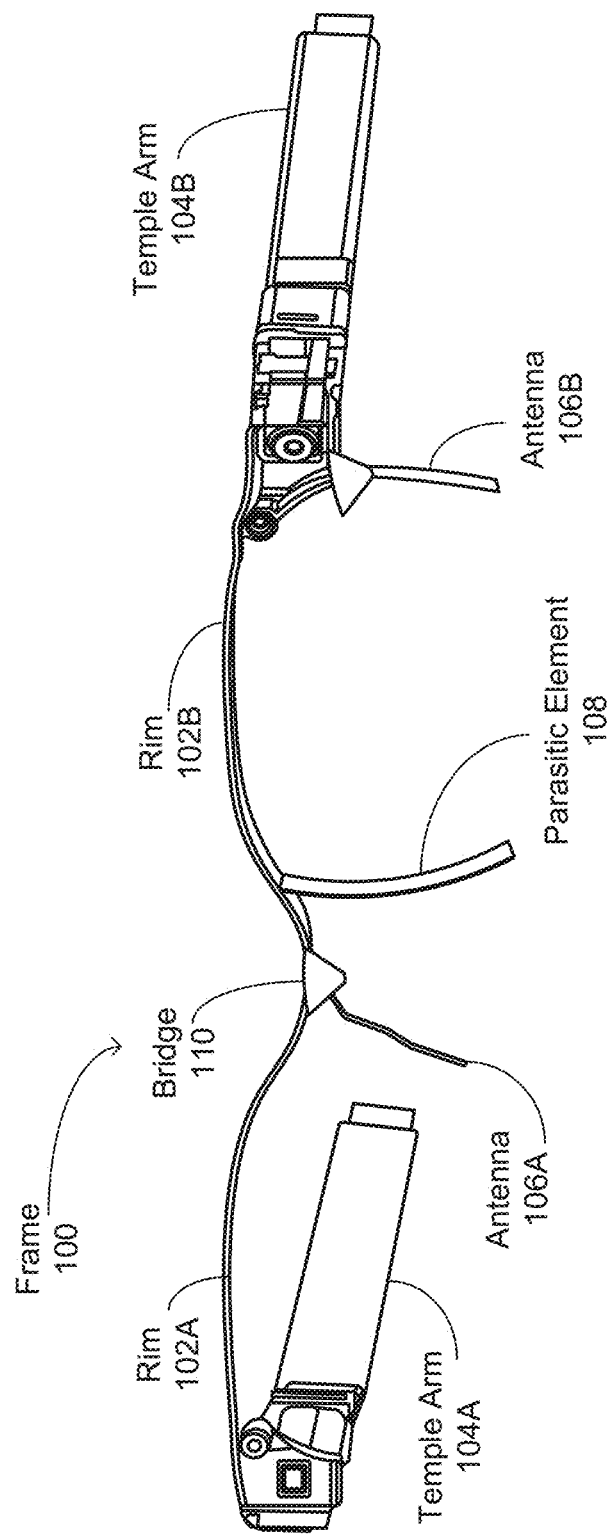
FIG. 1A shows an apparatus including an eyeglass frame, two antennae, and a parasitic element, according to a first example embodiment.

FIG. 1A shows an apparatus including an eyeglass frame 100, two antennae 106A, 106B, and a parasitic element 108, according to a first example embodiment. The apparatus and/or eyeglass frame 100 can be worn by a user. The frame 100 includes two rims 102A, 102B. FIG. 1A shows only the tops of the rims 102A, 102B for illustrative purposes. The rims 102A, 102B can support lenses and/or displays (not shown in FIG. 1A). In some examples, the apparatus can include displays mounted on, and/or supported by, the rims 102A, 102B and facing the user. In some examples, the apparatus can include cameras mounted on the frame 100 and facing away from and/or toward the user. When the frame 100 is worn by a user, the rims 102A, 102B can be located in front of the user's eyes.

The frame 100 can include a bridge 110. The bridge 110 can be attached to, and/or connect, the rims 102A, 102B to each other. When the frame 100 is worn by a user, the bridge 110 can rest on the user's nose.

The 100 frame can include two temple arms 104A, 104B. Each of the temple arms 104A, 104B can be hingedly and/or rotatably attached and/or connected to one of the rims 102A, 102B. When the frame 100 is worn by a user, the temple arms 104A, 104B can each rest on one of the user's ears.

The apparatus can include multiple antennae 106A, 106B, such as a first antenna 106A and a second antenna 106B. The antennae 106A, 106B can be attached to the frame 100. Attaching antennae 106A, 106B to the frame 100 can include mounting one or more of the antennae 106A, 106B to the frame 100, or surrounding one or more of the antennae 106A, 106B by the frame 100 so that one or more of the antenna 106A, 106B are inside the frame 100 and not visible to a user. In some examples, the first antenna 106A can be mounted on the first rim 102A, and the second antenna 106B can be mounted on, or disposed inside, the second rim 102B. In the example shown in FIG. 1A, the first antenna 106A is disposed on a side of the rim 102A that is closer to the parasitic element 108 than an opposite side of the rim 102A. Opposing sides of the rims 102A, 102B can have a lens in between the opposing sides of the rims 102A, 102B. For example, a first side of the rim can be adjacent to the temple arm and a second side of the rim, which is opposite the first side, can be adjacent to the bridge 110. The location of the antenna 106A, 106B on the rims 102A, 102B can dispose the antennae 106A, 106B as far as possible from the user's head and/or body, minimizing interference caused by the user's body to transmissions by the antennae 106A, 106B. In some examples, one or more of the antennae 106A, 106B can be disposed on respective portions of the temple arms 104A, 104B that are adjacent to the rims 102A, 102B.

The antennae 106A, 106B can communicate via similar frequencies. For example, a center frequency at which the first antenna 106A is configured to communicate can be within five percent (5%) of a center frequency at which the second antenna 106B is configured to communicate. The center frequency can be a central frequency between upper and lower cutoff frequencies, and/or can be an arithmetic mean or geometric mean of the lower cutoff frequency and the upper cutoff frequency of the antenna 106A, 106B. In some examples, one of the first and second antenna 106A, 106B can be configured to communicate via Institute for Electrical and Electronics Engineers (IEEE) 802.11 (Wireless Fidelity/WiFi) and the other of the first and second antenna 106A, 106B can be configured to communicate via Bluetooth™, both of which have center frequencies of 2.4 Gigahertz (2.4 GHz). In some examples, both antenna 106A, 106B can be configured to communicate via 802.11. In some examples, the antenna(e) that is configured to communicate via IEEE 802.11 can also communicate via bands with center frequencies of 5 GHz and/or 6 GHz. In some examples, both antenna 106A, 106B can be configured to communicate via Bluetooth™.

In the example shown in FIG. 1A, the parasitic element 108 is attached to a portion of the second rim 102B that is closer to the bridge 110 than to the second temple arm 104B. The second antenna 106B is attached to a portion of the second rim 102B that is closer to the second temple arm 104B than to the bridge 110. The first antenna 106A is attached to a portion of the first rim 102A that is closer to the bridge 110 than to the first temple arm 104A. These distances are illustrated in at least FIG. 2A.

The apparatus can include a parasitic element 108, which can also be referred to as a conductive sheet. The parasitic element 108 can be mounted on the frame 100, such as on one of the rims 102A, 102B. The parasitic element 108 can extend along one of the rims 102A, 102B. The parasitic element 108 can be generally between the antennae 106A, 106B, such as being closer to each of the antenna 106A, 106B than the antennae 106A, 106B are to each other. The parasitic element 108 can include a flat sheet of conductive material, such as metal. The parasitic element 108 can extend along one of the rims 102A, 102B in a direction perpendicular to a user's face. The parasitic element 108 can be oriented to maximize a surface area of the parasitic element 108 facing each of the antennae 106A, 106B. The parasitic element 108 can reduce the coupling and/or interference between electromagnetic signals transmitted and/or sent by the antenna 106A, 106B.

Figure 1B:
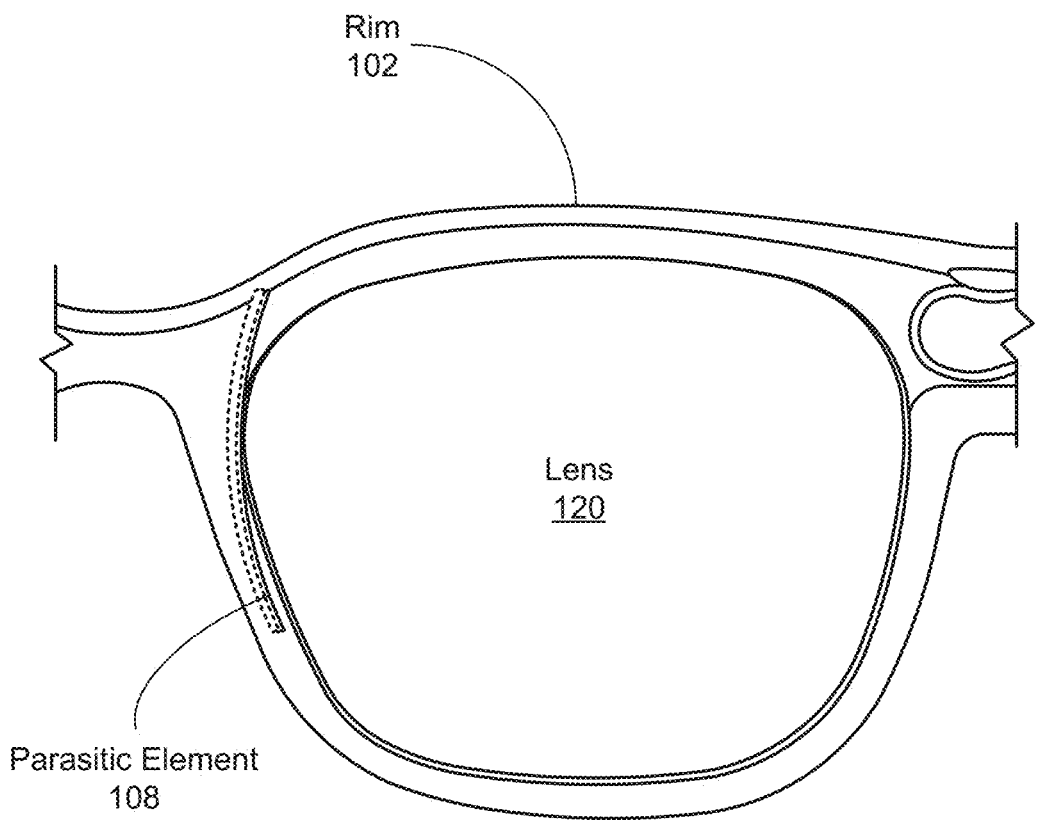
FIG. 1B shows a rim included in the eyeglass frame.

FIG. 1B shows a rim 102 included in the eyeglass frame 100. The rim 102 can include either of the rims 102A, 102B described above. As shown in FIG. 1B, the parasitic element 108 is attached to and/or along an inner portion of the rim 102. The parasitic element 108 can be disposed inside the rim 102, so that the parasitic element 108 is not visible to a user. The parasitic element 108 can be curved, following the shape of the lens 120.

While this description describes the antennae 106A, 106B as being disposed on the rims 102A, 102B, one or both of the antennae 106A, 106B can be disposed at other locations on the frame 100. Either or both of the antenna 106A, 106B could be disposed on the bridge 110, or on either or both of the temple arms 104A, 104B, for example.

The rim 102 can surround, enclose, and/or support a lens 120. The lens 120 can include, or can be a component of, a display that faces and/or presents images to the user. The images presented to the user by the display can create a virtual reality and/or augmented reality experience for the user. In some implementations, the display can include a projector.

Figure 1C:
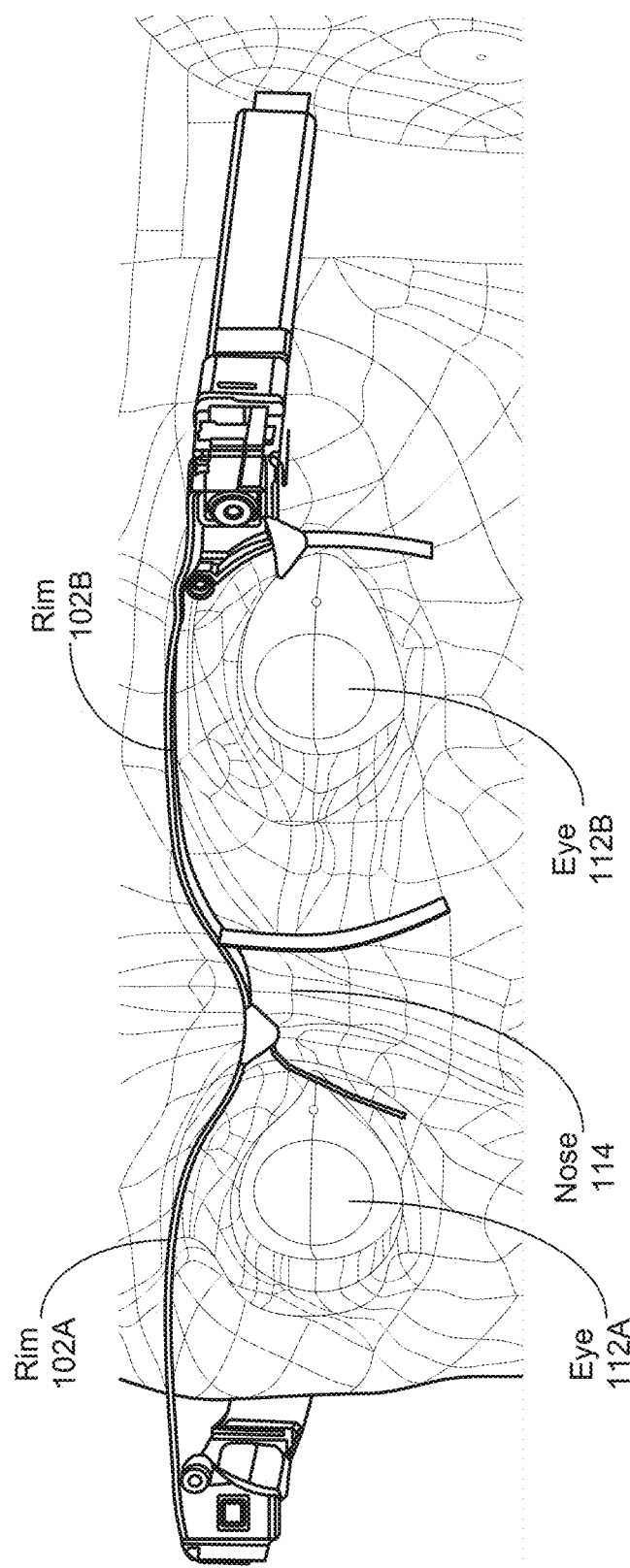
FIG. 1C shows a user wearing the apparatus of FIG. 1A.

FIG. 1C shows a user wearing the apparatus of FIG. 1A. As shown in FIG. 1C, the bridge 110 rests on the user's nose 114, and the temple arms 104A, 104B rest on the user's ears. The rims 102A, 102B, which can support displays, are in front of the user's eyes.

Figure 1D:
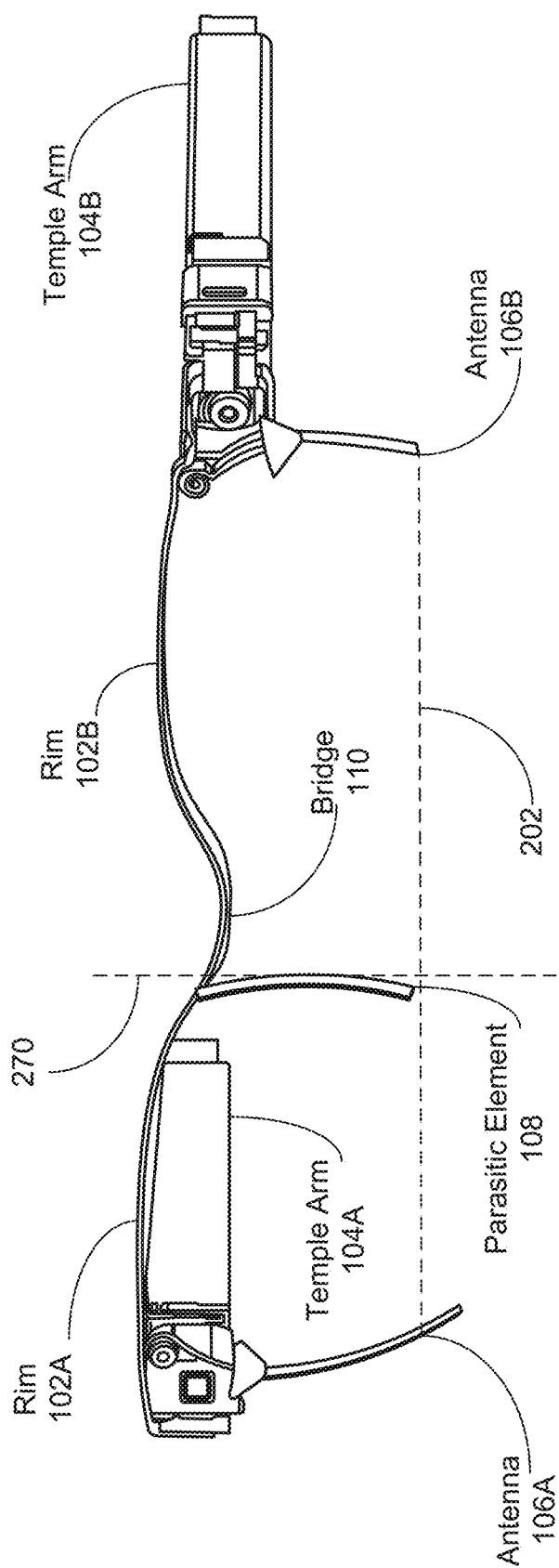
FIG. 1D shows the apparatus according to a second example embodiment.

FIG. 1D shows the apparatus according to a second example embodiment. The apparatus shown in FIG. 1D can include components that have similar features to components of the apparatus shown in FIGS. 1A, 1B, and 1C. In the example shown in FIG. 1D, the first antenna 106A is disposed on an opposite side of the same rim 102A as the parasitic element 108. The second antenna 106B is on a side of the second rim 102B that is farther from the parasitic element 108 than an opposite side of the rim 102A. Portions of a rim 102A, 102B if a line between them bisects the area enclosed by the rim 102A, 102S (which can include a lens 120) in such a way that each of the two portions of the area divided by the bisecting line includes no less than one fourth of the total area enclosed by the rim 102A, 102B.

In the example shown in FIG. 1D, the first antenna 106A is attached to a portion of the rim 102A that is closer to the first temple arm 104A than to the bridge 110. The parasitic element is attached to a portion of the first rim 102A that is closer to the bridge 110 than to the first temple arm 104A. The second antenna 106B is attached to a portion of the second rim 102B that is closer to the second temple arm 104B than to the bridge 110.

A perpendicular line 270 is described below with respect to FIG. 2E, and an axis 202 is described below with respect to FIGS. 2A and 2E.

Figure 2A:
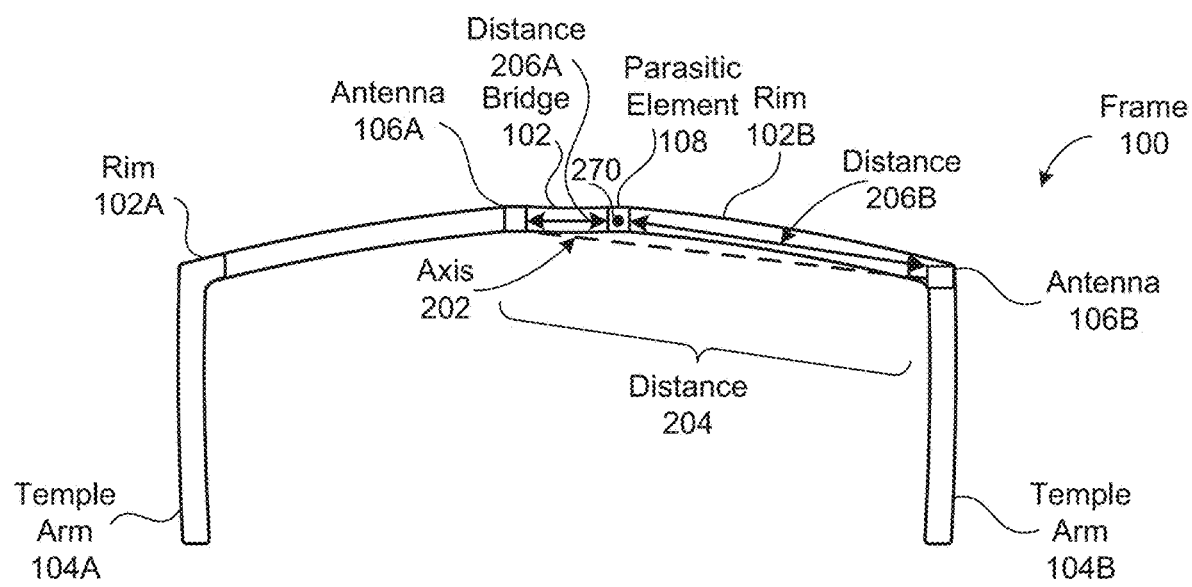
FIG. 2A is a top view of the apparatus.

FIG. 2A is a top view of the apparatus. A distance 206A between the parasitic element 108 and the first antenna 106A can be less than a distance 204 between the first antenna 106A and the second antenna 106B. A distance 206B between the parasitic element 108 and the second antenna 106B can be less than the distance 204 between the first antenna 106A and the second antenna 106B. These relative distances apply to both the embodiments of FIG. 1A and FIG. 1D.

An axis 202 can extend from the first antenna 106A to the second antenna 106B. The parasitic element 108 can extend, in a length and/or longest direction of the parasitic element 108 (which in this figure is into and out of the page of FIG. 2A), in a direction that is generally perpendicular to the axis 202. Generally perpendicular can include within five degrees (5°) of perpendicular, within fifteen degrees (15°) of perpendicular, or within thirty degrees (30°) of perpendicular, as non-limiting examples. A perpendicular line 270, that extends into and out of the page as shown in FIG. 2A, is described below with respect to FIG. 2E.

The parasitic element 108 can have an orientation that is generally perpendicular to the axis 202. The orientation can refer to the direction of extension of the width, or second-longest direction, of the parasitic element 108. The generally perpendicular orientation of the parasitic element 108 to the axis 202 maximizes the surface area of the parasitic element 108 presented to the antenna 106A, 108B. The maximization of the surface area maximizes the reduction of coupling and/or interference between the antenna 106A, 106B.

Figure 2B:
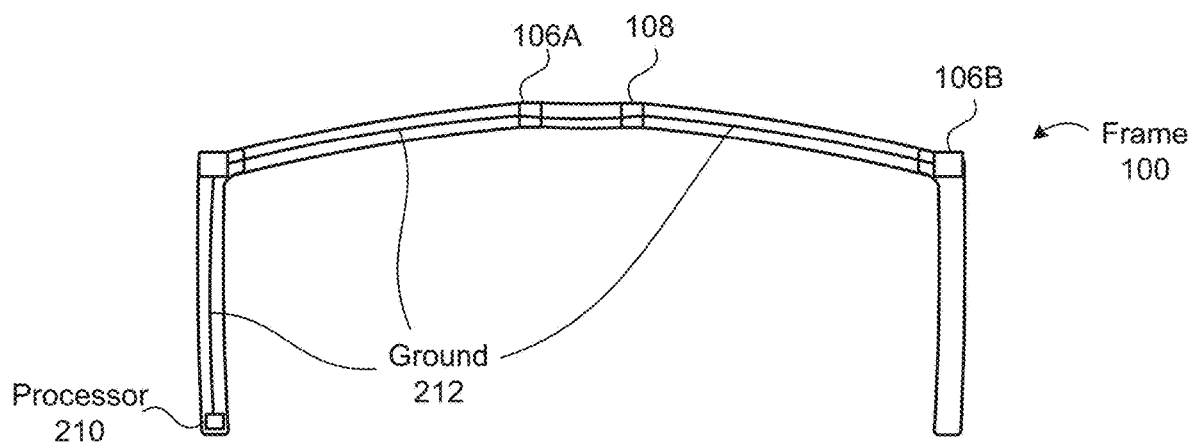
FIG. 2B is another top view of the apparatus.

FIG. 2B is another top view of the apparatus. In some examples, the apparatus can include a ground 212. The ground 212 can include a conductive wire and/or sheet, such as metal. The ground 212 can also be considered a conductive element. The ground 212 can be attached to and/or extend through and/or along the frame 100. The ground 212 can be included inside the frame, so that the ground 212 is not visible to the user. The ground 212 can electrically couple the first antenna 106A, the second antenna 106B, and the parasitic element 108 to each other and/or to ground. In some examples, the apparatus can include a processor 210 included in, attached to, and/or supported by the frame 100, and the ground 212 can electrically couple the first antenna 106A, the second antenna 106B, the parasitic element 108, and the processor 210 to each other and/or to ground. The processor 210 can control communications by the antennae 106A, 106B, can control displays supported by the rims 102A, 102B, and/or can control one or more cameras included in the apparatus and supported by the frame 100 to generate a virtual reality and/or augmented reality experience for the user. The ground 212 can electrically couple the first antenna 106A to the parasitic element 108. The ground 212 can electrically couple the first antenna 106A to the second antenna 106B. The ground 212 can electrically couple the parasitic element 208 to the second antenna 106B.

Figure 2C:
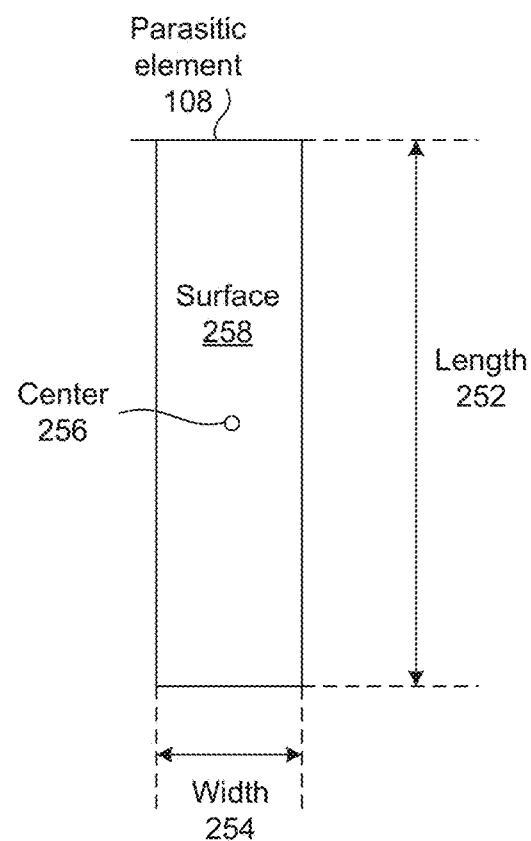
FIG. 2C shows the parasitic element.

FIG. 2C shows the parasitic element 108. A length 252 of the parasitic element 108 can be at least twice a width 254 of the parasitic element 108, such as at least three times or at least five times the width 254 of the parasitic element 108. The length 252 can be considered the longest direction of the parasitic element 108. The width 254 can be considered a second-longest direction of the parasitic element 108. The width 254 can be at least twice a depth and/or thickness of the parasitic element 108, such as at least three times or at least five times the depth and/or thickness of the parasitic element 108.

The length 252 of the parasitic element 108 can be approximately one-half of a wavelength of the center frequency at which the antenna 106A, 106B communicate, such as within five percent (5%), ten percent (10%), or twenty percent (20%) of the wavelength of the center frequency, and/or no more than half of a wavelength of the center frequency. If the length 252 of the parasitic element 108 is greater than half the wavelength of the center frequency, some of the benefits of reducing coupling and/or interference can be reduced and/or lost. In the example in which the antenna 106A, 106B communicate with center frequencies of 2.4 Gigahertz (2.4 GHz), the length 252 of the parasitic element 108 can be less than, and/or no greater than, forty-one millimeters (41 mm) (the wavelength when traveling through plastic, which some components of the frame 100 can include, is shorter than the wavelength when traveling through the air due to the greater index of refraction of plastic than the index of refraction of air). In some examples, the antenna 106A, 106B (not shown in FIG. 2C) can have lengths of one-quarter of a wavelength of the center frequency, or 3.125 cm. The parasitic element 108 can have a length 252 that is twice the length of each antenna.

The width 254 of the parasitic element 108 can be based on a width of the inner portion of the rim 102A, 102B to which the parasitic element 108 is attached. In some examples, the width 254 can be 3.15 millimeters (3.15 mm). In some examples, the antenna 106Ae, 106B can have widths that are narrower than the parasitic element 108, such as 2.65 mm. The parasitic element 108 can be wider than the antennae 106A, 106B. The parasitic element 108 can, for example, be wider, in a direction that is perpendicular to a longest direction (the length 252) of the parasitic element 108 and is perpendicular to the axis 202 extending from the first antenna 106A to the second antenna 106B, than the antennae 106A, 106B.

A center 256 of the parasitic element 108 can be located at a center of mass and/or at a center of gravity of the parasitic element 108. The center 256 can be a point from which an angle of incidence is measured, as described below.

The parasitic element 108 can have two surfaces 258 (of which one is shown in FIG. 2C). The surfaces 258 can extend the length 252 and width 254 of the parasitic element 108. The surfaces 258 can be on opposite sides of the parasitic element. The angle of incidence can be measured from the center 256 of the surface 258, and/or from a normal line extending perpendicularly to a plane extending along the surface 258 at the center 256.

Figure 2D:
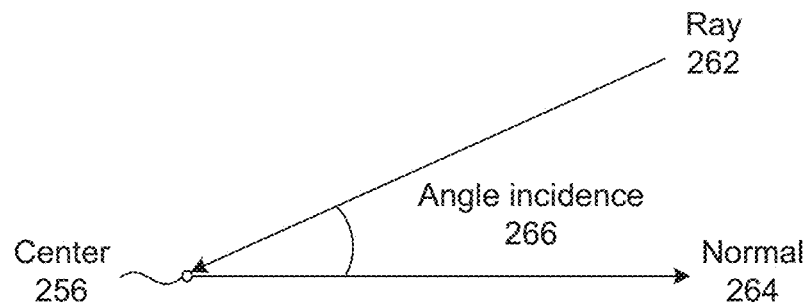
FIG. 2D shows an angle of incidence between an antenna and the parasitic element.

FIG. 2D shows an angle of incidence 266 between an antenna 106A, 106B and the parasitic element 108. The angle of incidence 266 can be measured between a normal line 264 and a ray 262. The normal line 264 can extend perpendicularly from the center 256 of the surface 258 of the conductive sheet and/or parasitic element 108. The ray 262 can extend from the center 256 of the parasitic element 108 to one of the antennae 106A, 106B.

The lower the angle of incidence 266, the greater the reduction of coupling and/or interference between the antennae 106A, 106B. The reduction of coupling can, for example, be a function of the cosine of the angle of incidence 266. In some examples, a first angle of incidence, between the ray 262, extending from a center of the first antenna 106A (which can represent either of the antennae 106A, 106B) to the center 256 of the parasitic element 108, and a first line perpendicular to a first surface 258 of the parasitic element 108 (such as the normal line 264) at a first point of incidence from the first ray 262, can be less than forty-five degrees (45°). A second angle of incidence 266 (which can be similar to the first angle of incidence 266 except that the second angle of incidence 266 is measured from a second and/or opposite side of the parasitic element 108 from the first angle of incidence 266) between a second ray extending a center of the second antenna 106B (which can be the opposite antenna 106A, 106B from which the first angle of incidence 266 is described in this paragraph) to the center 256 of the parasitic element 108 and a second line perpendicular to a second surface 258 of the parasitic element 108 (the second and/or opposite side and/or surface 258 of the parasitic element 108), at a second point of incidence from the second ray, can be less than forty-five degrees (45°)

Figure 2E:
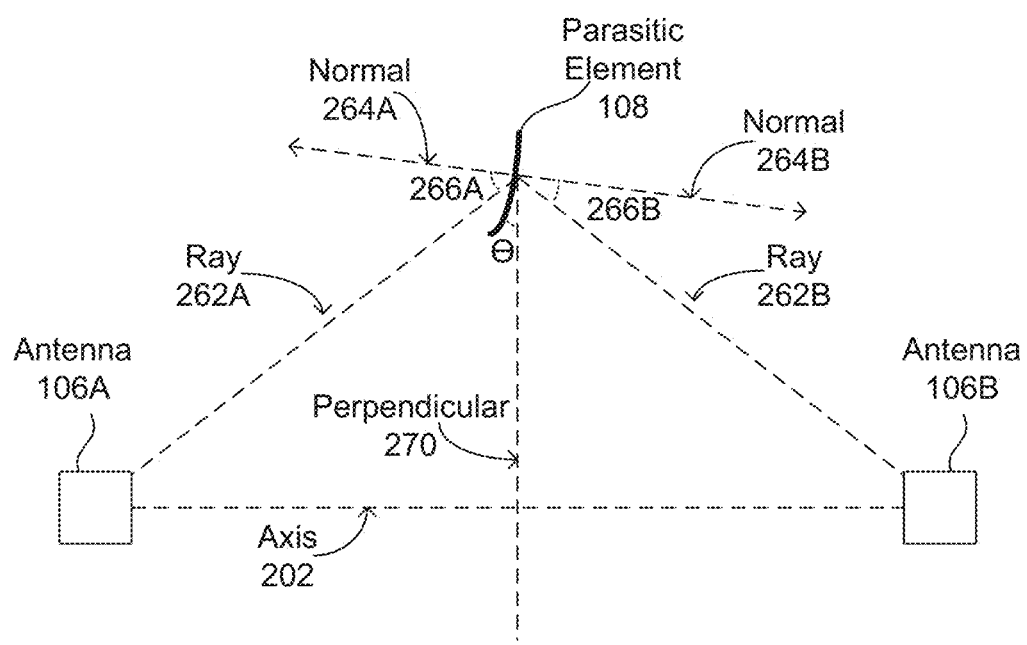
FIG. 2E shows angles between the parasitic element and antennae.

FIG. 2E shows angles 266A, 266B, Θ between the parasitic element 108 and antennae 106A, 106B. FIG. 2E shows angles of incidence 266A, 266B between normal lines 264A, 264B extending perpendicularly from opposite surfaces 258 of the parasitic element 108 and rays 262A, 262B extending from centers of the antenna 106A, 106B to the center 256 (not labeled in FIG. 2E) of the parasitic element 108. FIG. 2E is not drawn to scale, and the distance of the parasitic element from the axis 202 is exaggerated for illustrative purposes.

FIG. 2E also shows a perpendicular line 270 extending in a perpendicular direction from the axis 202 extending between the antennae 106A, 106B, to and along a tangent of the surface 258 of the parasitic element 208. An angle Θ between the perpendicular line 270 and the extension of the parasitic element 108 can represent a deviation from a perpendicular orientation of the parasitic element 108 to the axis 202. The smaller the angle Θ, the greater the reduction in coupling and/or interference between the antenna 106A, 106B. In some examples, the orientation of the parasitic element 108, which can be measured by the angle Θ, is less than thirty degrees (30°). In some examples, the angle Θ is less than fifteen degrees (15°). In some examples, the angle Θ is less than five degrees (5°).

Figure 3A:
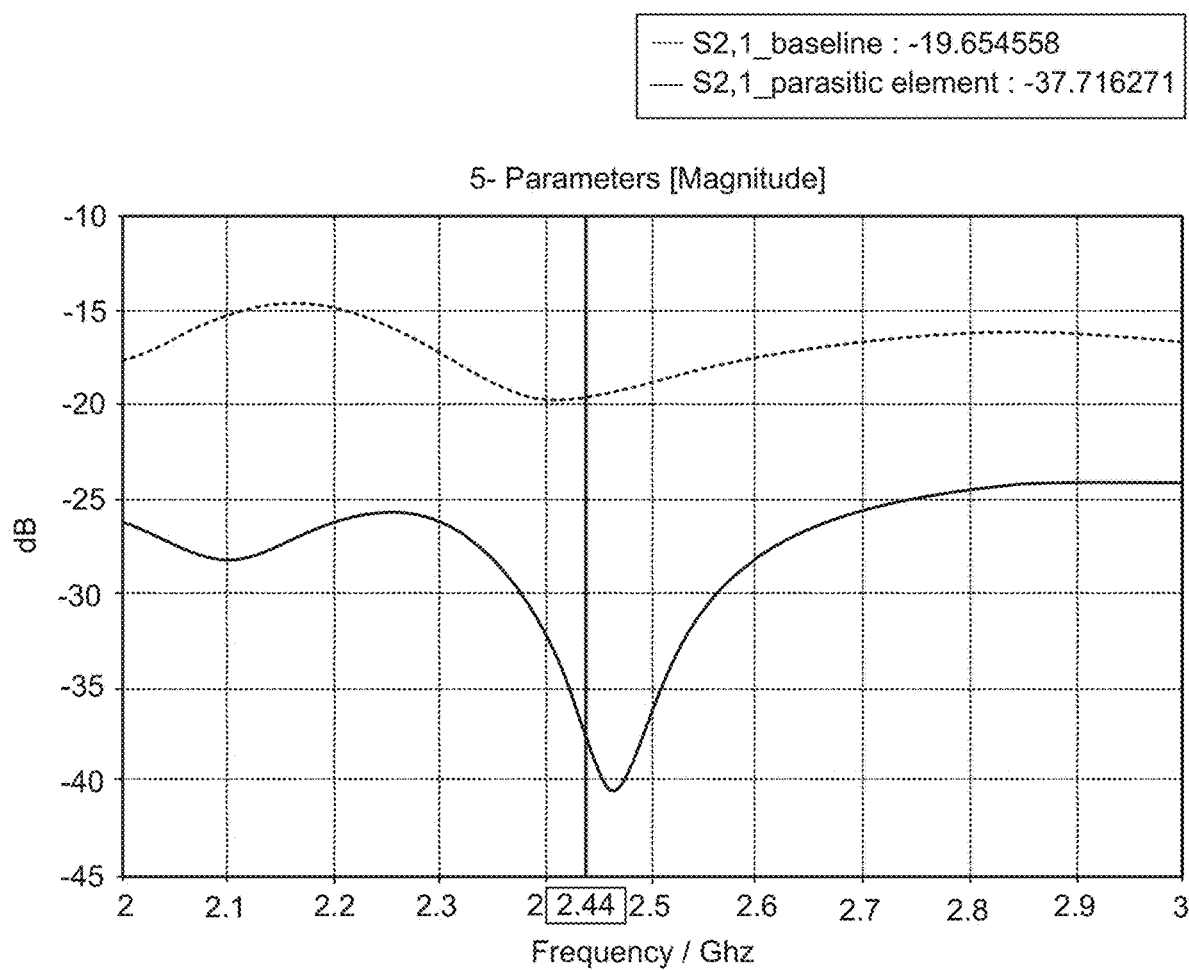
FIG. 3A is a graph showing scattering parameters as a function of frequency with and without the parasitic element in the first example embodiment.
Figure 3B:
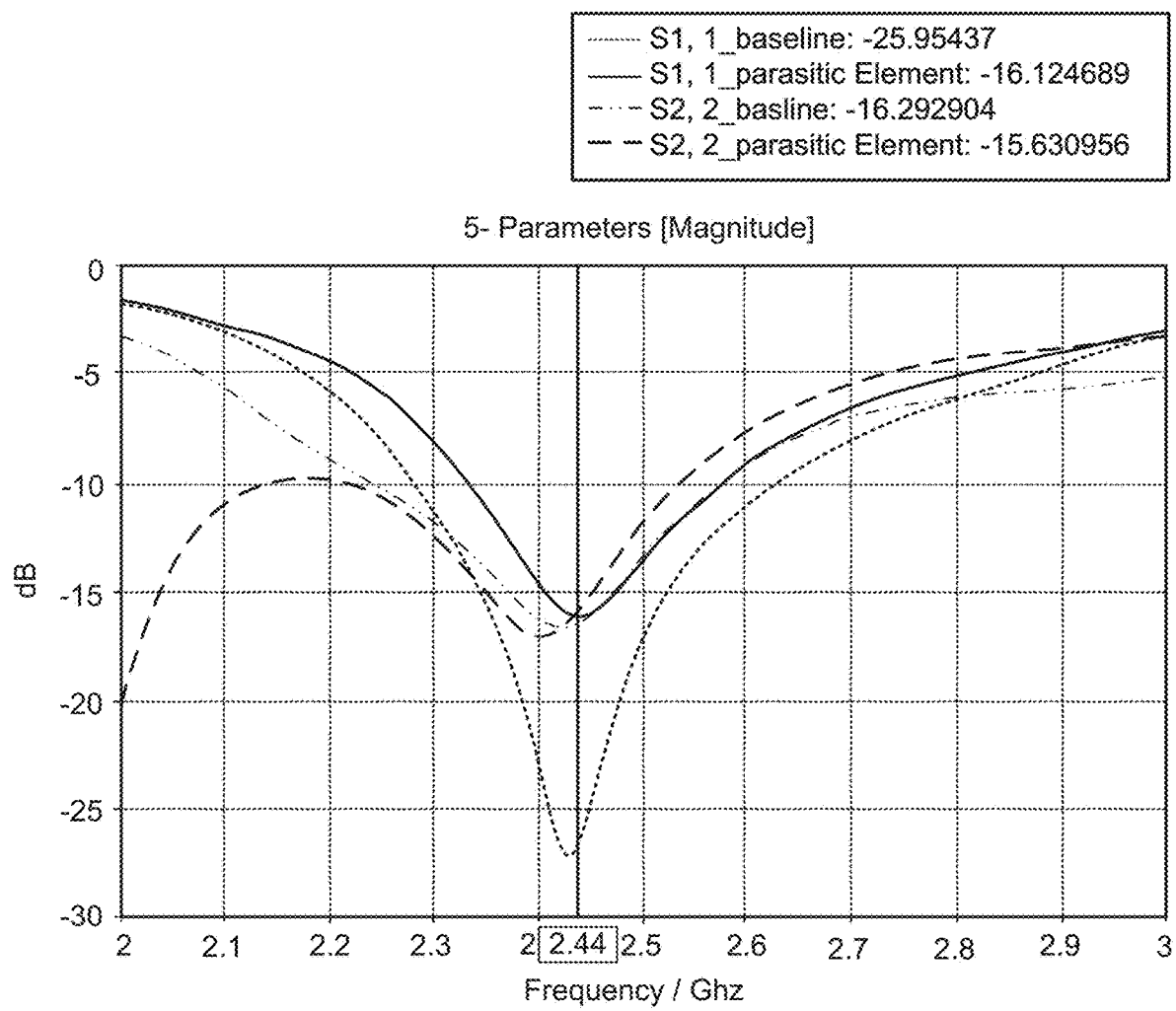
FIG. 3B is another graph showing scattering parameters as a function of frequency with and without the parasitic element in the first example embodiment.
Figure 3C:
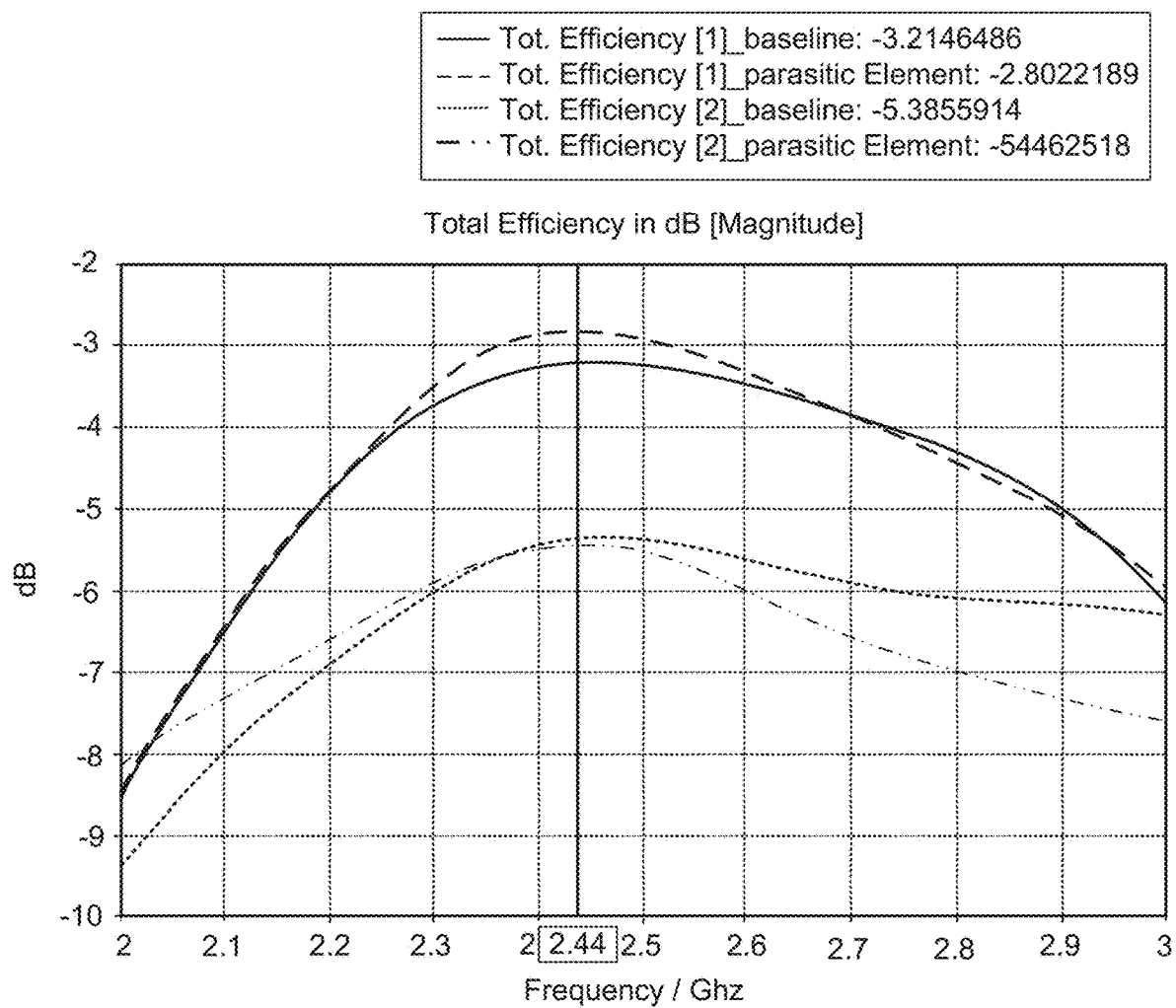
FIG. 3C is a graph showing impedance as a function of frequency with and without the parasitic element in the first example embodiment.

FIG. 3A is a graph showing scattering parameters as a function of frequency with and without the parasitic element in the first example embodiment. FIGS. 3A, 3B, and 3C show results for the example design of FIG. 1A, where the first antenna 106A is on the portion of the rim 102A that is closer to the bridge 110 and/or parasitic element 108. In these figures, the baseline curves show values without a parasitic element, whereas the Parasitic Element curves show values with the parasitic element. As shown in FIG. 3A, the scattering parameters are significantly reduced near the frequency of 2.45 GHz, near the center frequency of both Institute for Electrical and Electronics Engineers (IEEE) 802.11 ("Wireless Fidelity/WiFi") and Bluetooth™, by the inclusion of the parasitic element 108 in the apparatus.

FIG. 3B is another graph showing scattering parameters as a function of frequency with and without the parasitic element in the first example embodiment. As shown in FIG. 3B, both antennae's 106A, 106B impedance is improved by the inclusion of the parasitic element 108 in the apparatus.

FIG. 3C is a graph showing impedance as a function of frequency with and without the parasitic element in the first example embodiment. As shown in FIG. 3C, both antennae's 106A, 106B no loss of efficiency is caused by the inclusion of the parasitic element 108 in the apparatus.

Figure 3D:
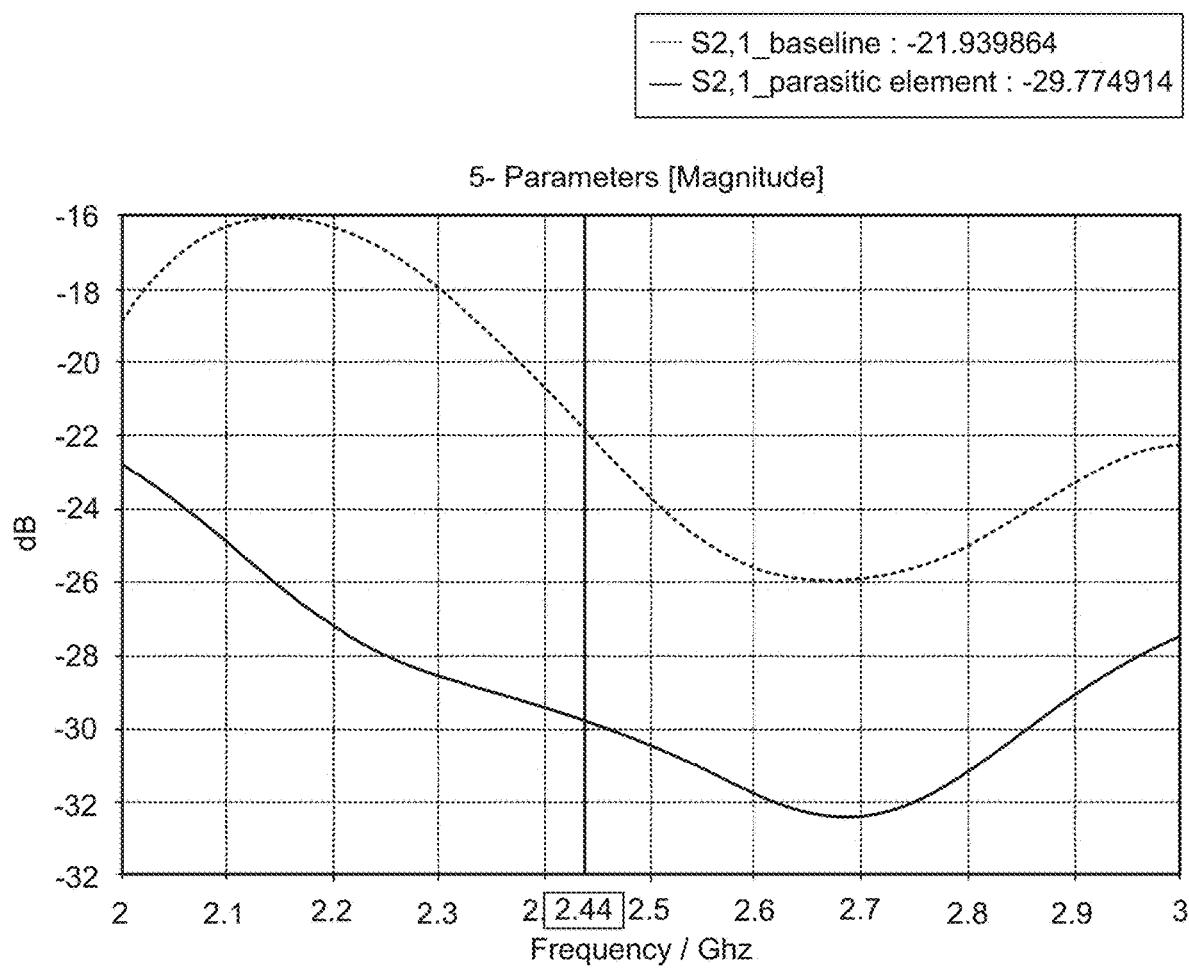
FIG. 3D is a graph showing scattering parameters as a function of frequency with and without the parasitic element in the second example embodiment.
Figure 3E:
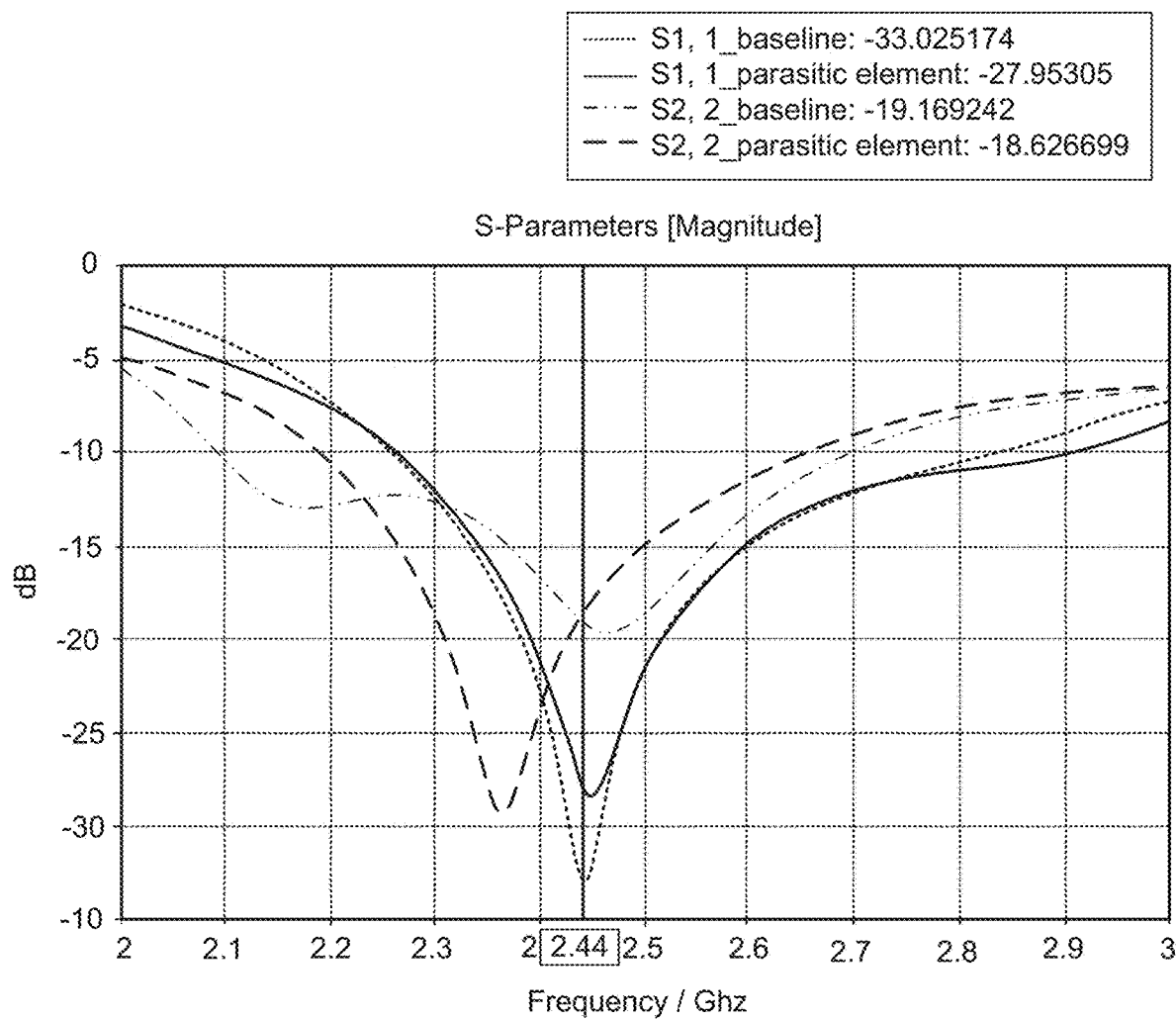
FIG. 3E is another graph showing scattering parameters as a function of frequency with and without the parasitic element in the second example embodiment.
Figure 3F:
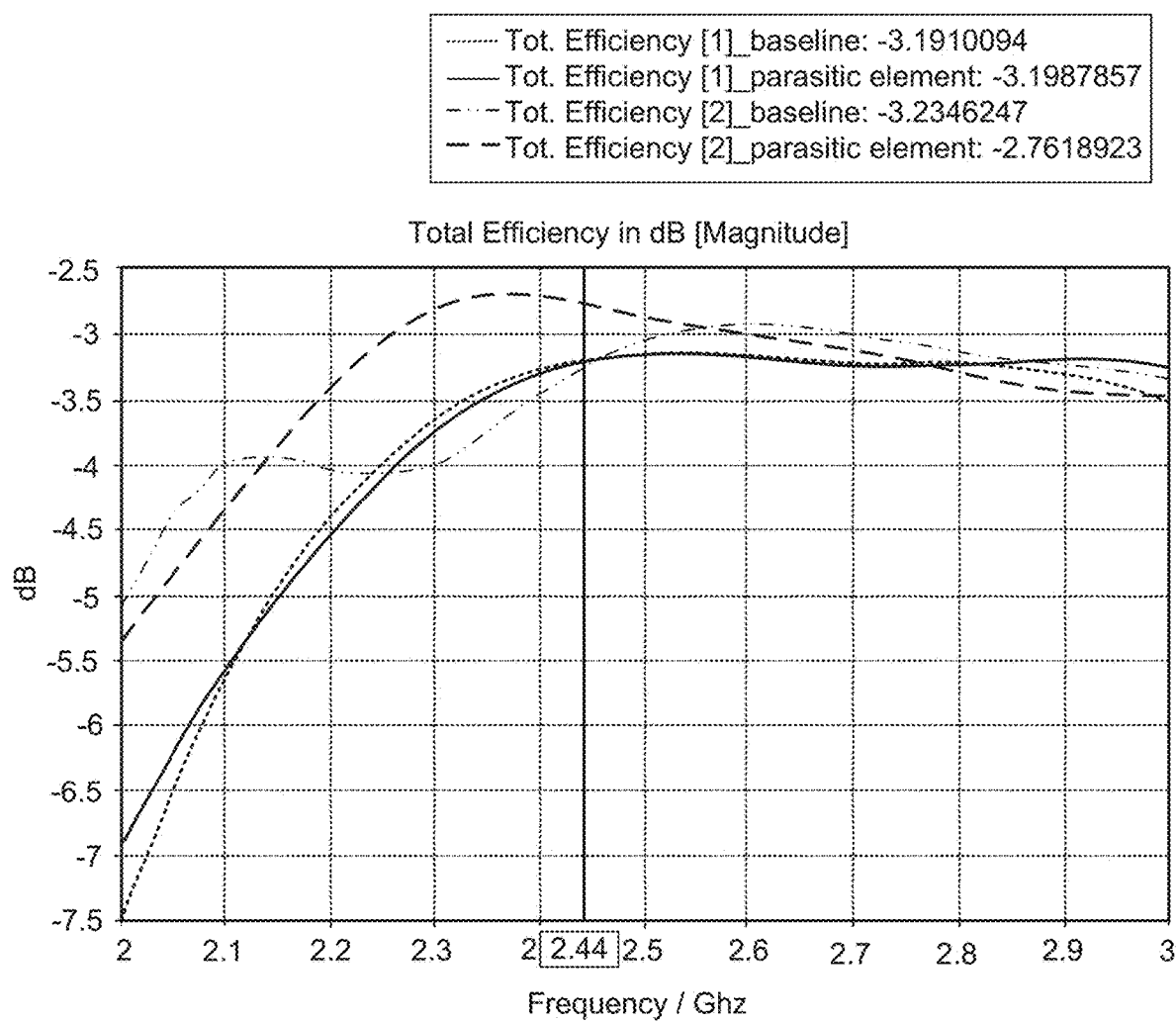
FIG. 3F is a graph showing impedance as a function of frequency with and without the parasitic element in the second example embodiment.

FIG. 3D is a graph showing scattering parameters as a function of frequency with and without the parasitic element in the second example embodiment. FIGS. 3D, 3E, and 3F show results for the example design of FIG. 1D, where the second antenna 106A is on the portion of the rim 102B that is farther from the bridge 110 and/or parasitic element 108. In these figures, the baseline curves show values without a parasitic element, whereas the Parasitic Element curves show values with the parasitic element. As shown in FIG. 3D, the inclusion of the parasitic element 108 in the apparatus suppresses bye mutual coupling of the antenna 106A, 106B by approximately seven decibels (7 dB).

FIG. 3E is another graph showing scattering parameters as a function of frequency with and without the parasitic element in the second example embodiment. As shown in FIG. 3B, both antennae's impedance is improved by the inclusion of the parasitic element 108 in the apparatus.

FIG. 3F is a graph showing impedance as a function of frequency with and without the parasitic element in the second example embodiment. As shown in FIG. 3C, both antennae's 106A, 106B no loss of efficiency is caused by the inclusion of the parasitic element 108 in the apparatus.

Figure 4A:
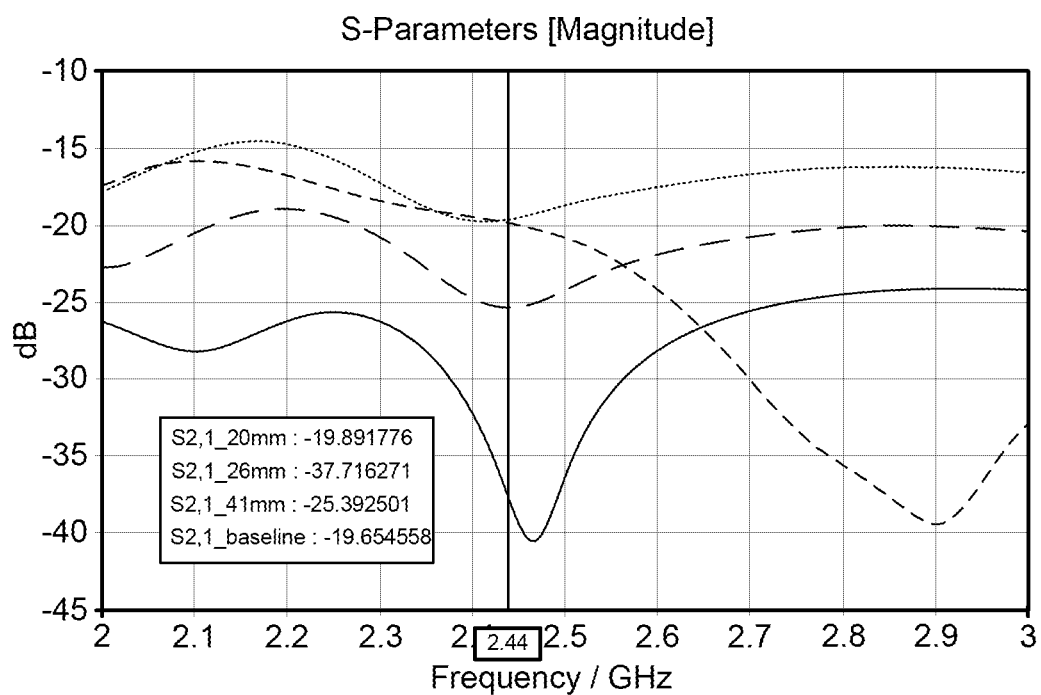
FIG. 4A is a graph showing scattering parameters as a function of frequency without the parasitic element and with parasitic elements of various lengths in the first example embodiment.
Figure 4B:
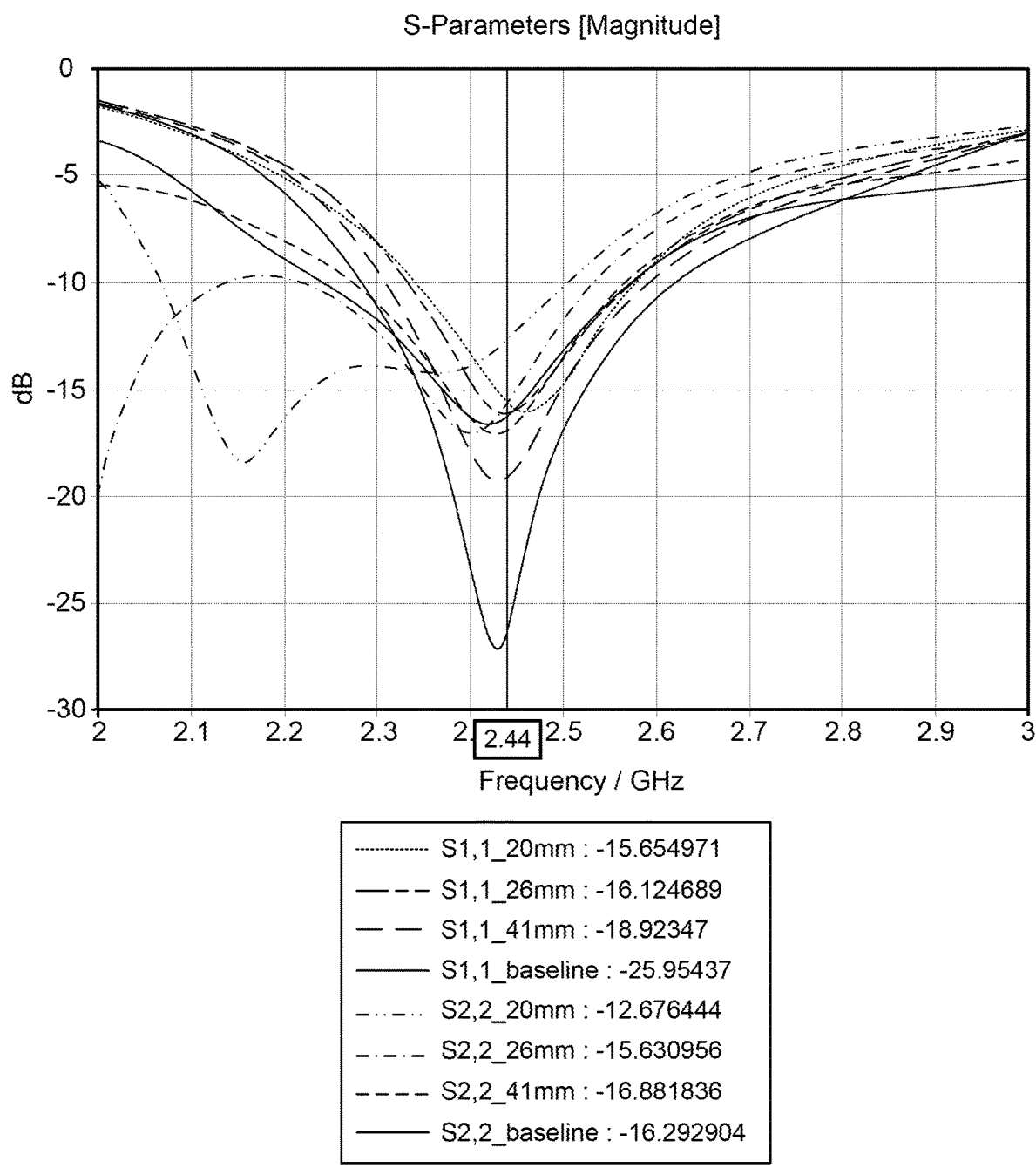
FIG. 4B is another graph showing scattering parameters as a function of frequency without the parasitic element and with parasitic elements of various lengths in the first example embodiment.
Figure 4C:
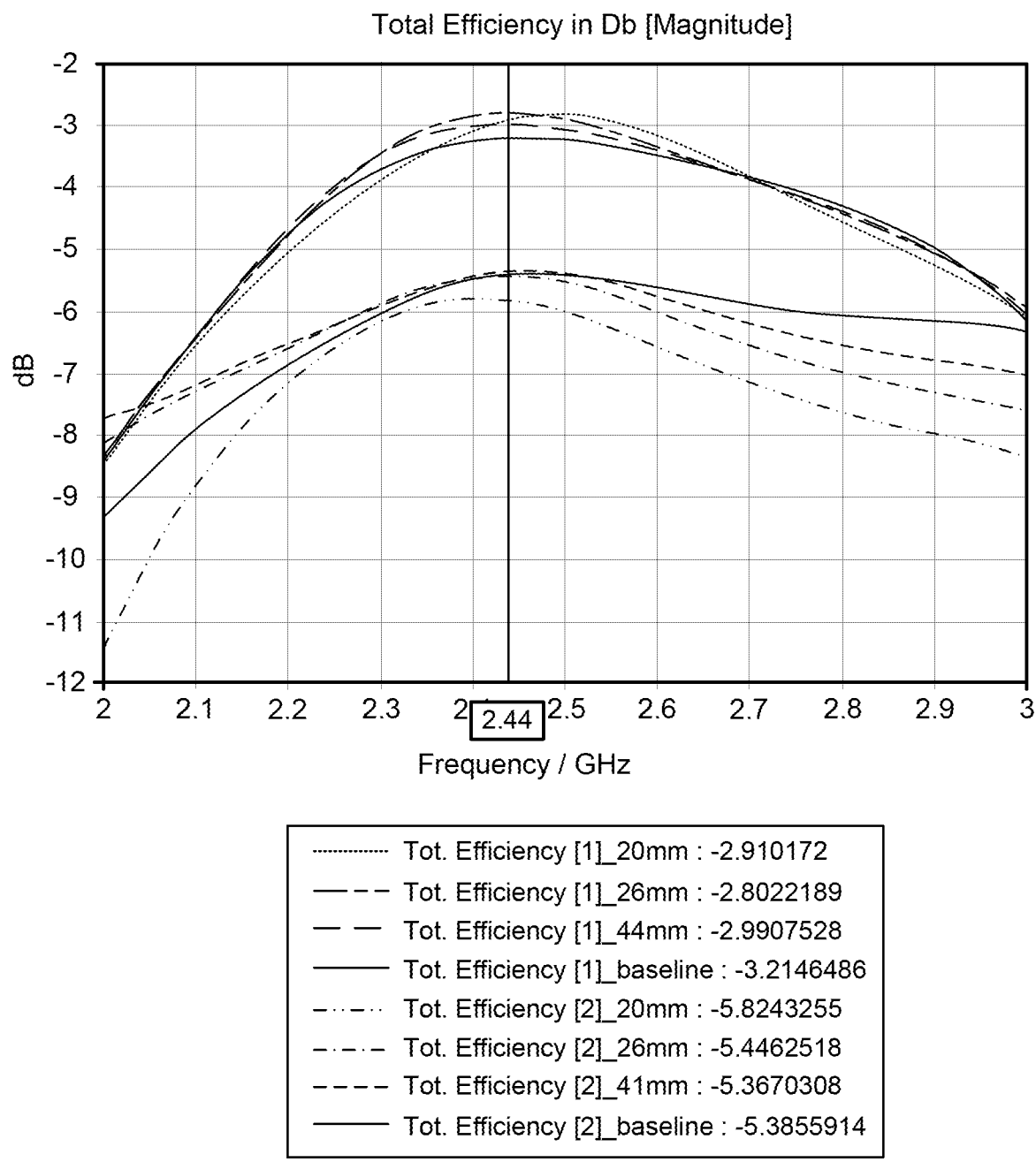
FIG. 4C is a graph showing impedance as a function of frequency without the parasitic element and with parasitic elements of various lengths in the first example embodiment.
Figure 4D:
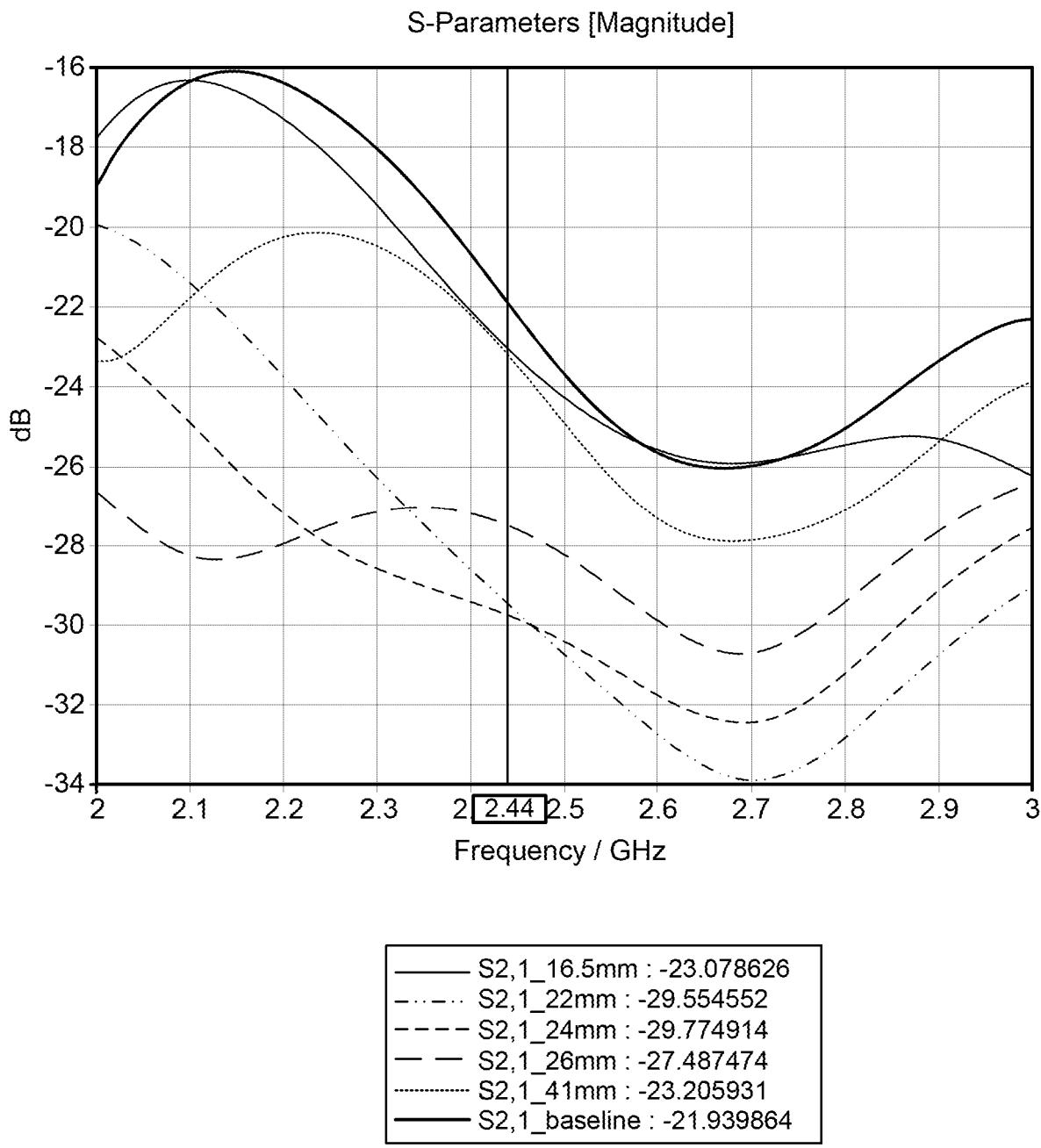
FIG. 4D is a graph showing scattering parameters as a function of frequency without the parasitic element and with parasitic elements of various lengths in the second example embodiment.
Figure 4E:
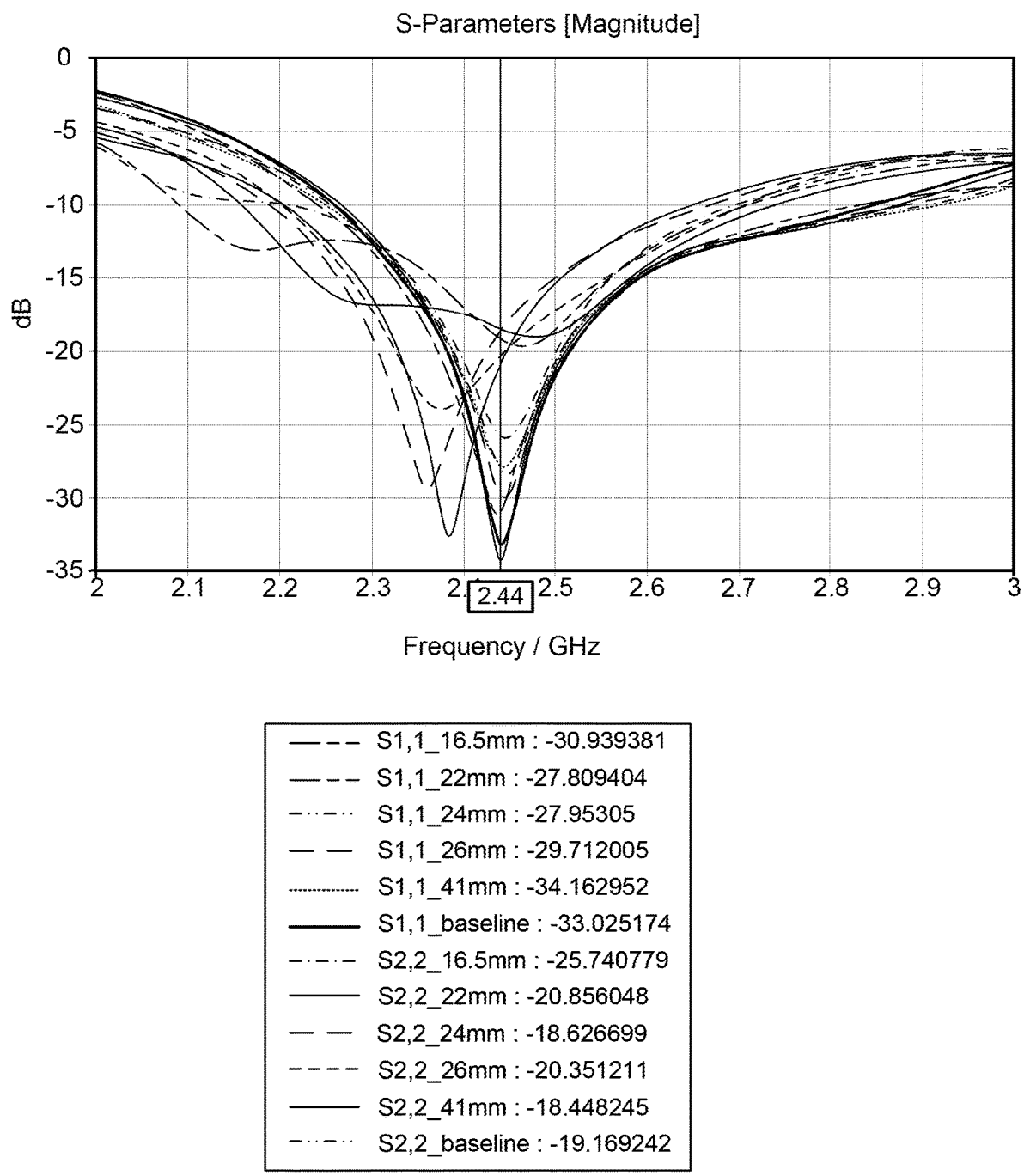
FIG. 4E is another graph showing scattering parameters as a function of frequency without the parasitic element and with parasitic elements of various lengths in the second example embodiment.
Figure 4F:
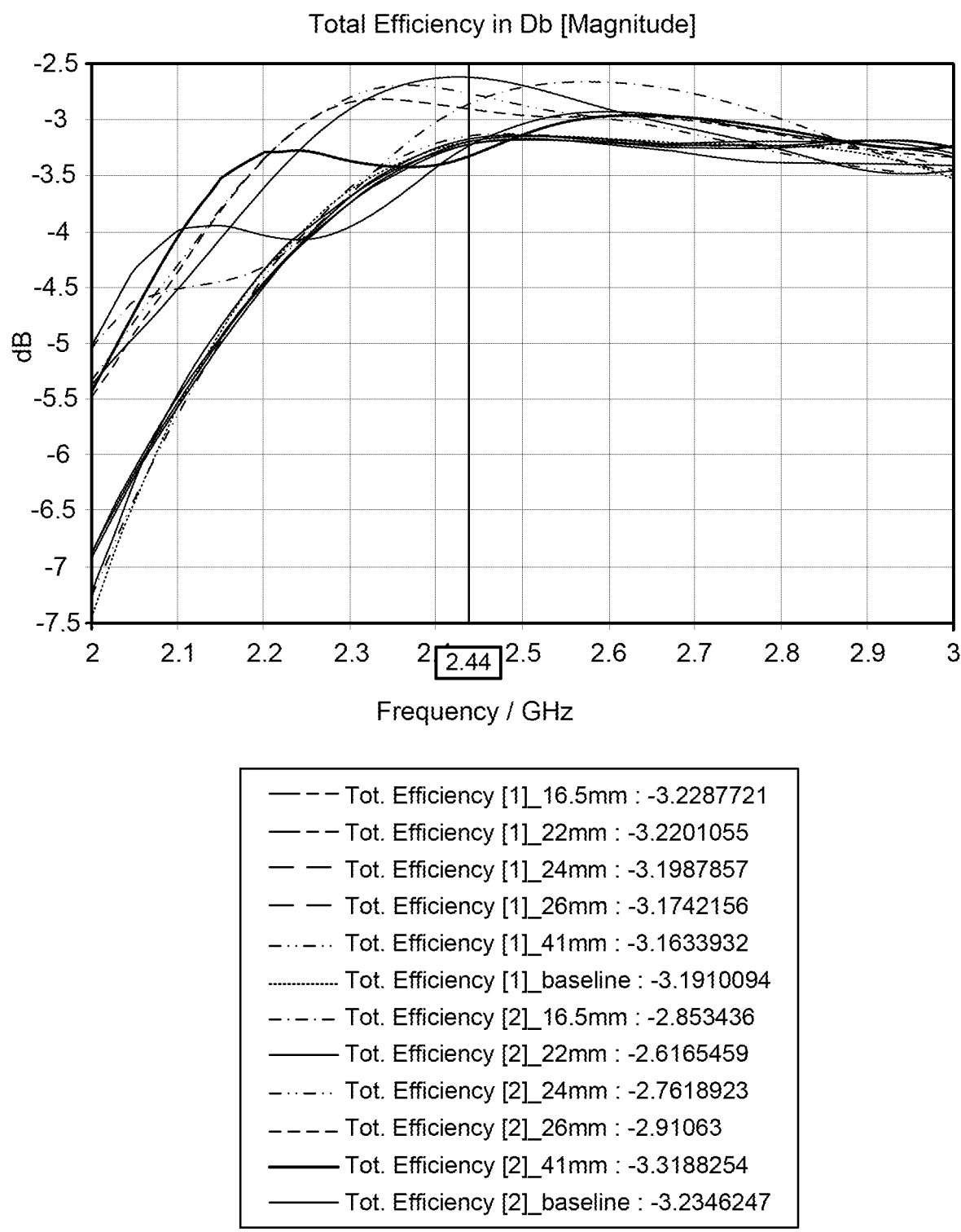
FIG. 4F is a graph showing impedance as a function of frequency without the parasitic element and with parasitic elements of various lengths in the second example embodiment.

FIGS. 4A, 4B, 4C, 4D, 4E, 4F are graphs corresponding to FIGS. 3A, 3B, 3C, 3D, 3E, and 3F, with additional curves showing values for parasitic elements of various lengths. FIGS. 4A, 4B, and 4C show results for the example design of FIG. 1A, where the first antenna 106A is on the portion of the rim 102A that is closer to the bridge 110 and/or parasitic element 108. FIGS. 4D, 4E, and 4F show results for the example design of FIG. 1D, where the second antenna 106A is on the portion of the rim 102B that is farther from the bridge 110 and/or parasitic element 108. As shown in these figures, lengths that are less than half of a wavelength provide optimal values in reducing scattering and/or improving efficiency. As shown in these figures, with center frequencies of 2.4 GHz, embodiments in which the parasitic element 108 has a length 252 less than the half-wavelength value of forty-one millimeters (41 mm), and/or a length 252 between forty-one millimeters (41 mm) and twenty millimeters (20 mm) have optimal performance. In some examples, the parasitic element 108 has a length 252 less than forty-one millimeters (41 mm), and/or a length 252 between forty-one millimeters (41 mm) and twenty millimeters (20 mm).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a touchscreen display, a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus comprising:
   an eyeglass frame including a first rim, a second rim, and a bridge connected to the first rim and the second rim;
   a first antenna attached to the eyeglass frame;
   a second antenna attached to the eyeglass frame; and
   a parasitic element inside the first rim.

2. The apparatus of claim 1, wherein the parasitic element comprises a flat sheet of conductive material.

3. The apparatus of claim 1, wherein a center frequency at which the first antenna is configured to communicate is within five percent (5%) of a center frequency at which the second antenna is configured to communicate.

4. The apparatus of claim 1, wherein the parasitic element has a length, in a longest direction of the parasitic element, that is no greater than half of a wavelength that the first antenna is configured to communicate.

5. The apparatus of claim 1, wherein:
   the parasitic element is wider, in a direction that is perpendicular to a longest direction of the parasitic element and is perpendicular to an axis extending from the first antenna to the second antenna, than the first antenna; and
   the parasitic element is wider, in the direction that is perpendicular to the longest direction of the parasitic element and is perpendicular to the axis extending from the first antenna to the second antenna, than the second antenna.

6. The apparatus of claim 1, wherein:
   at least one of the first antenna and the second antenna is configured to communicate via Bluetooth™; and
   the other of the first antenna and the second antenna is configured to communicate via Institute for Electrical and Electronics Engineers (IEEE) 802.11.

7. The apparatus of claim 1, further comprising a ground wire attached to the frame and coupled to the first antenna, the second antenna, and the parasitic element.

8. The apparatus of claim 1, further comprising:
   a first display supported by the first rim; and
   a second display supported by the second rim.

9. The apparatus of claim 1, wherein:
   the first antenna is disposed on a first side of the first rim; and
   the parasitic element is disposed on a second side of the first rim, the second side of the first rim being opposite from the first side of the first rim.

10. The apparatus of claim 9, wherein the second antenna is disposed on the second rim.

11. An apparatus comprising:
an eyeglass frame including at least one rim;
a first antenna attached to the eyeglass frame;
a second antenna attached to the eyeglass frame, the second antenna being disposed on a first side of the at least one rim; and
a conductive sheet attached to the eyeglass frame, the conductive sheet being inside a second side of the at least one rim, the second side of the at least one rim being opposite from the first side, a distance from the first antenna to the second antenna being greater than a distance from the first antenna to the conductive sheet and the distance from the first antenna to the second antenna being greater than a distance from the second antenna to the conductive sheet.

12. The apparatus of claim 11, wherein a center frequency at which the first antenna is configured to communicate is within five percent (5%) of a center frequency at which the second antenna is configured to communicate.

13. The apparatus of claim 11, wherein:
the conductive sheet is wider, in a direction that is perpendicular to a longest direction of the conductive sheet and is perpendicular to an axis extending from the first antenna to the second antenna, than the first antenna; and
the conductive sheet is wider, in the direction that is perpendicular to the longest direction of the conductive sheet and is perpendicular to the axis extending from the first antenna to the second antenna, than the second antenna.

14. The apparatus of claim 11, wherein:
at least one of the first antenna and the second antenna is configured to communicate via Bluetooth™; and
the other of the first antenna and the second antenna is configured to communicate via Institute for Electrical and Electronics Engineers (IEEE) 802.11.

15. The apparatus of claim 11, further comprising a ground wire attached to the frame and coupled to the first antenna, the second antenna, and the conductive sheet.

16. The apparatus of claim 11, wherein the conductive sheet has an orientation that is within thirty degrees (30°) of perpendicular to an axis extending between the first antenna and the second antenna.

17. The apparatus of claim 11, further comprising:
a first display supported by the first rim; and
a second display supported by the second rim.

18. The apparatus of claim 11, further comprising a conductive element attached to the frame, the conductive element being electrically coupled to the first antenna, the second antenna, and the conductive sheet.

19. An apparatus comprising:
an eyeglass frame including at least one rim;
a first antenna attached to the eyeglass frame;
a second antenna attached to the eyeglass frame, the second antenna being disposed on a first side of the at least one rim; and
a parasitic element attached to the eyeglass frame, the parasitic element extending along a second side of the at least one rim, the second side of the at least one rim being opposite from the first side, a distance from the first antenna to the second antenna being greater than a distance from the first antenna to the parasitic element and the distance from the first antenna to the second antenna being greater than a distance from the second antenna to the parasitic element, the parasitic element having an orientation that is within thirty degrees (30°) of perpendicular to an axis extending between the first antenna and the second antenna.

20. The apparatus of claim 19, wherein the orientation of the parasitic element is within five degrees (5°) of perpendicular to the axis extending between the first antenna and the second antenna.

21. An apparatus comprising:
an eyeglass frame including a first rim, a second rim, and a bridge connected to the first rim and the second rim;
a first antenna attached to the eyeglass frame;
a second antenna attached to the eyeglass frame; and
a parasitic element attached to the eyeglass frame, an orientation of the parasitic element being within thirty degrees (30°) of perpendicular to an axis extending between the first antenna and the second antenna.

* * * * *